United States Patent
Romanski et al.

(10) Patent No.: US 10,941,832 B2
(45) Date of Patent: Mar. 9, 2021

(54) HYDROMOUNT

(71) Applicant: VIBRACOUSTIC GMBH, Darmstadt (DE)

(72) Inventors: Thomas Romanski, Grünstadt (DE); Viktor Klostreich, Bad König (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 69 days.

(21) Appl. No.: 16/482,441

(22) PCT Filed: Jan. 12, 2018

(86) PCT No.: PCT/EP2018/050754
§ 371 (c)(1),
(2) Date: Jul. 31, 2019

(87) PCT Pub. No.: WO2018/141531
PCT Pub. Date: Aug. 9, 2018

(65) Prior Publication Data
US 2020/0040961 A1      Feb. 6, 2020

(30) Foreign Application Priority Data

Feb. 1, 2017    (DE) .................... 10 2017 101 968.5

(51) Int. Cl.
*F16F 13/10*      (2006.01)
*F16F 13/26*      (2006.01)

(52) U.S. Cl.
CPC ............ *F16F 13/106* (2013.01); *F16F 13/26* (2013.01); *F16F 2222/12* (2013.01); *F16F 2230/0005* (2013.01)

(58) Field of Classification Search
CPC .. F16F 13/106; F16F 13/26; F16F 2230/0005; F16F 2222/12; B60K 5/1208
See application file for complete search history.

(56) References Cited

U.S. PATENT DOCUMENTS 5,344,127 A * 9/1994 Hettler .................... F16F 13/26
                                                      267/140.13
5,911,412 A * 6/1999 Durand .................. F16F 13/26
                                                      267/140.13
(Continued)

FOREIGN PATENT DOCUMENTS

CN       1235880 A      11/1999
CN       1626845 A       6/2005
(Continued)

OTHER PUBLICATIONS

CN Search Report 2018800092565, dated Sep. 23, 2020.
International Serach Report PCT/EP2018/050754, filed May 4, 2018.

*Primary Examiner* — Xuan Lan Nguyen
(74) *Attorney, Agent, or Firm* — Fishman Stewart PLLC

(57) ABSTRACT

A hydromount that is suitable for mounting a motor vehicle engine at a vehicle body includes a supporting spring supporting a mount core and surrounding a working chamber, and a compensating chamber separated from the working chamber by a separating assembly and delimited by a compensating diaphragm. The separating assembly may have at least two nozzle systems which have one decoupling diaphragm each and in each of which one damping duct is disposed. The compensating chamber and the working chamber may be filled with a liquid and may be connected to each other in a liquid-conducting manner by damping ducts. The separating assembly may have an absorber duct connecting the working chamber with the compensating chamber. A switchable actuating member may be assigned to the absorber duct.

20 Claims, 2 Drawing Sheets

(56) References Cited

U.S. PATENT DOCUMENTS

| | | | | |
|---|---|---|---|---|
| 6,244,578 | B1 * | 6/2001 | Schwerdt | F16F 13/26 267/140.13 |
| 6,585,242 | B2 * | 7/2003 | Kodama | F16F 13/26 267/140.13 |
| 6,592,110 | B2 * | 7/2003 | Takashima | F16F 13/26 267/140.13 |
| 6,601,835 | B2 | 8/2003 | Genesseaux | |
| 7,210,674 | B2 | 5/2007 | Maeno et al. | |
| 7,275,739 | B2 * | 10/2007 | Winkler | F16F 13/26 267/140.14 |
| 8,556,240 | B2 * | 10/2013 | Hasegawa | F16F 13/26 267/140.14 |
| 9,605,727 | B2 * | 3/2017 | Kim | F16F 13/26 |
| 2005/0285318 | A1 * | 12/2005 | Winkler | F16F 13/105 267/140.13 |
| 2014/0145383 | A1 | 5/2014 | Yasuda et al. | |

FOREIGN PATENT DOCUMENTS

| | | | |
|---|---|---|---|
| CN | 103363012 | A | 10/2013 |
| DE | 19807868 | A1 | 9/1999 |
| DE | 60202234 | T2 | 6/2005 |
| EP | 1443240 | A1 | 8/2004 |
| EP | 1544500 | A2 | 6/2005 |
| EP | 2743540 | A1 | 6/2014 |
| EP | 3045766 | A1 | 7/2016 |
| JP | 2006-214586 | A | 8/2006 |

* cited by examiner

HYDROMOUNT

CROSS-REFERENCE TO RELATED APPLICATIONS

This application is a National Stage Patent Application of International Patent Application No. PCT/EP2018/050754, filed Jan. 12, 2018, which claims the benefit of German Application Serial No. 10 2017 101 968.5, filed Feb. 1, 2017, the contents of each are incorporated by reference in their entireties.

TECHNICAL FIELD

The invention relates to a hydromount, in particular for mounting a motor vehicle engine at a vehicle body, comprising a supporting spring supporting a mount core and surrounding a working chamber, and a compensating chamber separated from the working chamber by a separating assembly and delimited by a compensating diaphragm, wherein the separating assembly includes at least two nozzle systems which have one decoupling diaphragm each and in each of which one damping duct is disposed, and wherein the compensating chamber and the working chamber are filled with a liquid and are connected to each other in a liquid-conducting manner by the damping ducts.

BACKGROUND

Such hydromounts are also referred to as hydraulically damping mounts and serve for supporting a motor vehicle engine on a motor vehicle body in order to, on the one hand, dampen the vibrations caused by road bumps and, on the other hand, to provide isolation against acoustic vibrations. For example, the supporting spring consisting of an elastomeric material effects an acoustic isolation. The vibrations caused by road bumps are dampened by a hydraulic system, with the hydraulic system being formed by the liquid-dampened working chamber, the compensating chamber, and the damping ducts.

The working chamber is made larger or smaller by a movement of the supporting spring, whereby a hydraulic pressure is built up in the working chamber. Due to the pressure, the liquid located in the working chamber is pressed via the damping ducts into the compensating chamber. Due to the small diameter of the damping ducts and the high mechanical transmission associated therewith, which results from the equivalent displacing cross-section of the supporting spring in relation to the damping duct cross-section, the introduced vibrations are absorbed or damped.

In order to decouple high-frequency, low-amplitude vibrations, i.e. in the acoustically relevant range, the incorporation of an elastic diaphragm within the nozzle systems is known. In this case, the membrane vibrates with high-frequency, low-amplitude vibrations, so that a damping action is decoupled via the damping duct.

In idle operation of the engine, a dynamic reduction smaller than the static stiffness of the mount is desirable. In contrast, a high level of dynamic stiffness of the mount is demanded in the driving operation in order to efficiently dampen the prevailing engine vibrations. In this regard, it is known to provide hydromounts with a switching device with which the mount can be adapted to a driving operation or an idle operation of the engine.

DE 10 2004 059 406 B4 discloses a hydromount with a working chamber separated from a compensating chamber by an intermediate plate. Two ducts are incorporated into the intermediate plate. The intermediate plate has two nozzle systems comprising one diaphragm each.

Hydromounts in which an intermediate plate separates a working chamber from a compensating chamber are known from each of DE 198 07 868 C2 and DE 602 02 234 T2. One damping duct is incorporated into the intermediate plate in each case. Furthermore, the hydromounts each include an absorber duct configured to be switchable.

SUMMARY

The invention is based on the object of providing a mount that has an improved stiffness.

A hydromount with the features of claim 1 is proposed in order to achieve this object.

Advantageous embodiments of the hydromount are the subject matter of the dependent claims.

In the hydromount according to the invention, the separating assembly has an absorber duct connecting the working chamber with the compensating chamber, wherein a switchable actuating member is assigned to the absorber duct.

It is desirable that the hydromount has a low level of stiffness during the idle operation of the engine. For this purpose, the absorber duct connected in parallel is opened by the switchable actuating member, whereby the damping duct (Stuckerkanal) is switched off. The targeted adjustment of the idle-operation absorber duct results in achieving a reduction of the dynamic stiffness and in improving isolation at the desired idle-operation frequency.

In driving operation, however, vibrations having a high amplitude at a low frequency act on the mount. In this case, a high stiffness of the decoupling diaphragms is desirable in order to dampen the vibrations. In order to increase the stiffness of the decoupling diaphragms, it is advantageous during the driving operation that the absorber duct is closed. Therefore, opening the absorber duct causes a reduction of the dynamic stiffness of the hydromount in a defined frequency range, which depends on the exact geometry of the duct.

Advantageously, the actuating member can be switched electrically, pneumatically or mechanically. The absorber duct can be opened and closed by the actuating member because it is capable of being switched. The electric terminals required for the switching capability are usually available in current motor vehicle models, particularly in the case of a capability of being electrically switched. Such a switching capability can be realized in a cost-effective manner and with a compact design.

In an advantageous embodiment, the absorber duct penetrates the separating assembly in the axial direction. In this case, the absorber duct connects the working chamber with the compensating chamber.

Advantageously, the at least two nozzle systems are arranged in series in the direction from the working chamber to the compensating chamber, with the damping ducts of the nozzle systems following one another. As a result, the switching capability acts particularly on the nozzle system directly adjoining the working chamber.

In an advantageous embodiment, the absorber duct has a radial boundary formed on one of the nozzle systems. Thus, the radial boundary is formed in a continuous manner along the entire length of the absorber duct, so that no turbulences formed by irregularities in the radial boundary are able to form if the liquid flows through the absorber duct.

Advantageously, the separating assembly has at least one intermediate chamber that is disposed in each case between two adjacent nozzle systems.

Advantageously, the hydromount has a housing and a lid, the lid being fixed to the housing by flanging the housing. The flanging of the housing can result in a stable fixation in which the individual components of the hydromount are clamped together.

In one advantageous embodiment, the compensating diaphragm is clamped between the lid and one of the nozzle systems. In particular, the compensating diaphragm is clamped between the lid and the nozzle system that directly adjoins the compensating chamber. For this purpose, the nozzle system may have a recess into which the compensating diaphragm can be inserted.

BRIEF DESCRIPTION OF THE DRAWINGS

The invention is schematically explained below with reference to drawings by means of exemplary embodiments. In the drawings.

DETAILED DESCRIPTION

Figure 1:
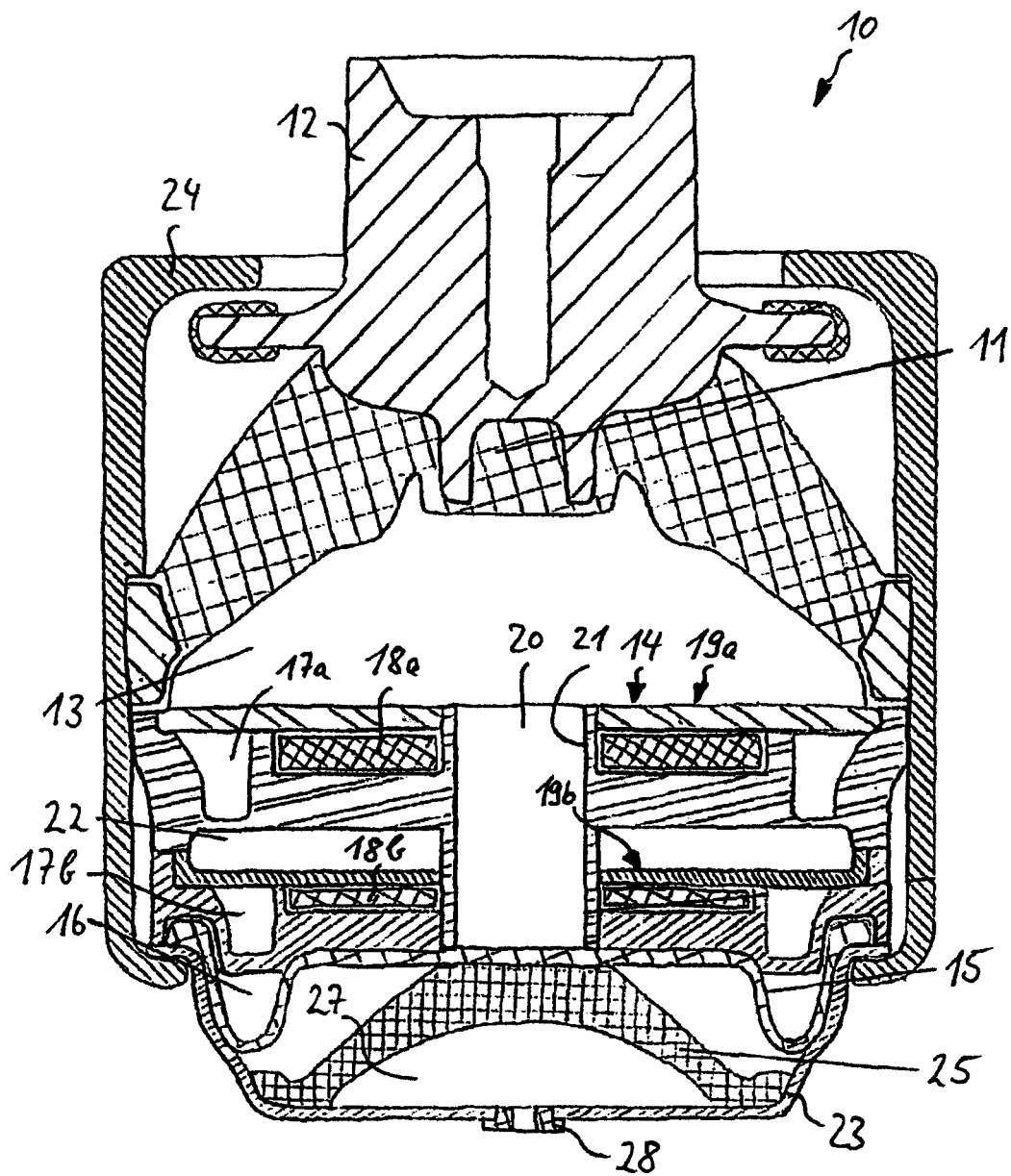
FIG. 1 shows a sectional view of a first exemplary embodiment of the hydromount having a capability of being switched pneumatically.
Figure 2:
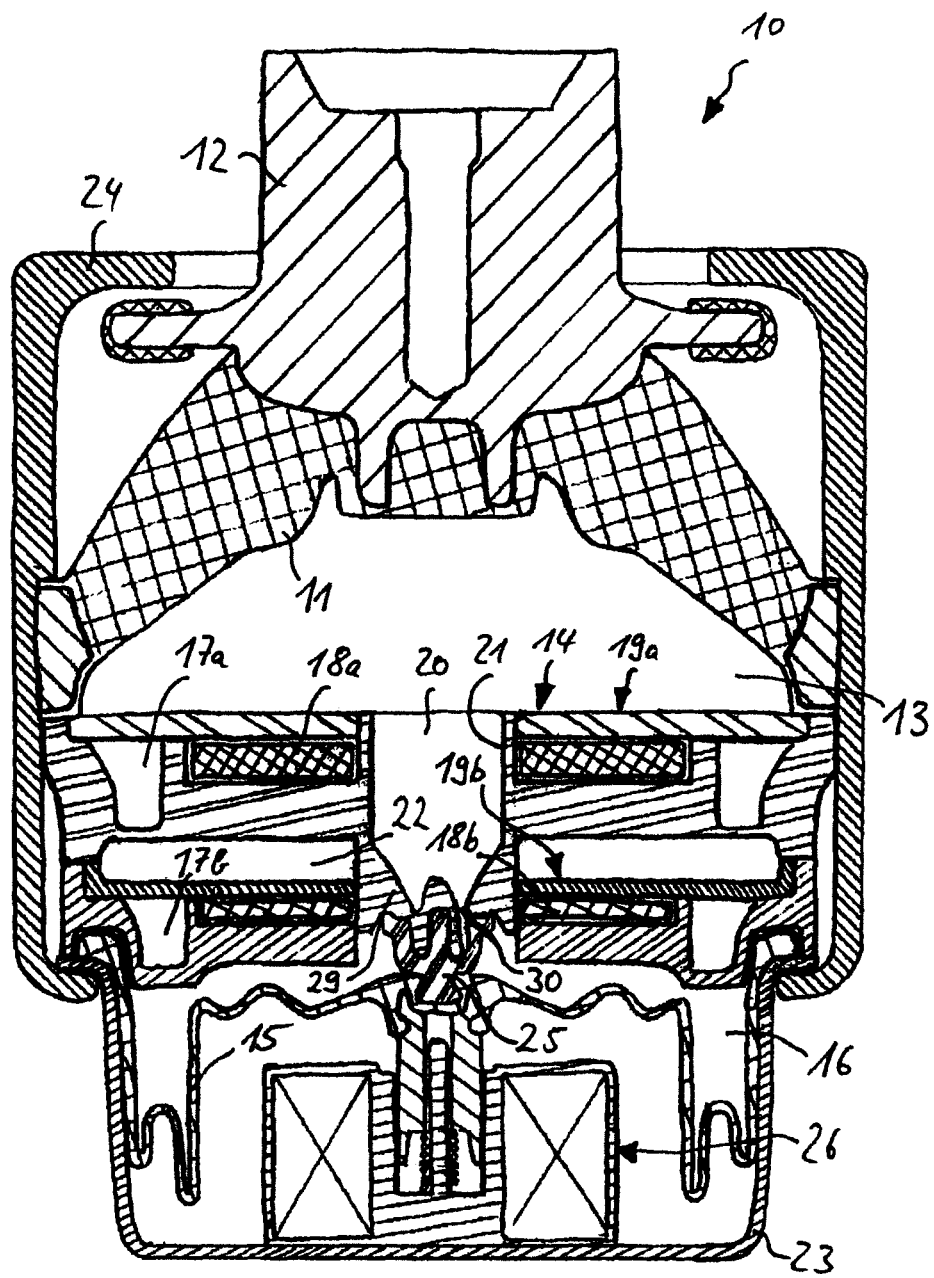
FIG. 2 shows a sectional view of a second exemplary embodiment of the hydromount having a capability of being switched electrically.

FIGS. 1 and 2 each show a hydromount 10 for supporting a motor vehicle unit that is not shown, in particular for supporting a motor vehicle engine that is not shown on a motor vehicle body that is not shown.

The hydromounts 10 each have a supporting spring 11 consisting of an elastomeric material for supporting a mount core 12 incorporated by vulcanization. The motor vehicle engine (not shown) is attached to the mount cores 12.

The supporting springs 11 each delimit a working chamber 13, which is separated from a compensating chamber 16 by means of a separating assembly 14. The compensating chambers 16 are each delimited by a compensating diaphragm 15, which is also referred to as a roller bellows. The chambers 13 and 16 are filled with a hydraulic liquid. The separating assembly 14 may have at least one first nozzle system 19a and one second nozzle system 19b. A damping duct 17a is formed in the first nozzle system 19a, and a damping duct 17b is formed in the second nozzle system 19b. The chambers 13, 16 are connected to each other in a liquid-conducting manner by the damping ducts 17a, 17b.

The nozzle systems 19a, 19b of the separating assembly 14 further include one decoupling diaphragm 18a, 18b each. The decoupling diaphragms 18a, 18b may be accommodated in the nozzle systems 19a, 19b in a positive fit, for example. The separating assembly 14 further has an absorber duct 20 connecting the working chamber 13 with the compensating chamber 16. A switchable actuating member 25 is assigned in each case to the absorber duct 20.

In particular, the actuating member 25 may be switched electrically, pneumatically or mechanically. The exemplary embodiment of the hydromount 10 shown in FIG. 1 has a pneumatic switchability of the actuating member 25. To this end, the actuating member 25 may be configured as an elastic member and connected to the compensating diaphragm 15. The actuating member 25 may further adjoin to an air chamber 27 which can be pressurized via an opening 28. Thus, the actuating member 25 closes the absorber duct 20 with the compensating diaphragm 15 when the air chamber 27 is pressurized. When the air chamber 27 is evacuated, so that a negative pressure prevails in it, the elastic actuating member 25 is sucked in the direction of the air chamber 27 so that the actuating member 25 opens the absorber duct 20.

The exemplary embodiment of the hydromount 10 shown in FIG. 2 has an electric switchability of the actuating member 25. For this purpose, the hydromount 10 includes an electrical actuator 26, which is capable of causing the actuating member 25 to move. In the exemplary embodiment shown in FIG. 2, the actuating member 25 can be engaged with a feed 29 formed on the absorber duct 20 in such a way that the actuating member 25 and the feed 29 close the absorber duct 20. A connecting duct 30, which connects the absorber duct 20 with the compensating chamber 16, is formed between the feed 29 and the actuating member 25. The connecting duct 30 is opened when the actuating member 25 is moved away from the absorber duct 20. If the actuating member 25 is moved towards the absorber duct 20, the connecting duct 30, and thus the absorber duct 20, is closed.

In the exemplary embodiment according to FIG. 2, the actuating member 25 and the feed 29 can be positively connected. For this purpose, the actuating member 25 may have a projection in the center, for example, which is capable of reaching into a recess formed on the feed 29. Furthermore, the actuating member 25 may have an arm resting against the feed 29, in order to close the connecting duct 30.

Thus, the absorber duct 20 can be opened and closed by means of the switchable actuating member 25. In the process, an absorptive action is obtained in the opened state of the absorber duct 20. Moreover, the hydromount 10 has a low level of stiffness. This is desirable particularly in the case of an idle operation of the engine, in which high-frequency and low-amplitude vibrations are to the isolated. The decoupling diaphragms 18a, 18b vibrate with vibrations having a low amplitude at a high frequency, and cause decoupling. A damping action is prevented by the decoupling of the vibrations.

In the closed state of the absorber duct 20, the dynamic stiffness of the hydromount 10 is increased, whereby a suitable damping action of low-frequency and high-amplitude vibrations, as they occur during the driving operation, is obtained.

Therefore, opening the absorber duct 20 causes a reduction of the dynamic stiffness of the hydromount in a defined frequency range, which depends on the exact geometry of the duct.

The absorber duct 20 penetrates the separating assembly 14 in the axial direction. The nozzle systems 19a, 19b are arranged in series in the direction from the working chamber 13 to the compensating chamber 16. The damping ducts 17a, 17b of the nozzle systems 19a, 19b follow one another and are separated only by an intermediate chamber 22, so that a continuous connection of the working chamber 13 to the compensating chamber 16 is ensured by the damping ducts 17a, 17b.

The absorber duct 20 has a radial boundary 21 formed on one of the nozzle systems 19a, 19b. In the exemplary embodiments according to FIGS. 1 and 2, the radial boundary 21 is in each case formed on the nozzle system 19a that directly adjoins the working chamber 13.

The hydromounts 10 each have a housing 24 and a lid 23. The lid 23 is fixed to the housing 24 by flanging the housing 24. In this case, the compensating diaphragm 15 is clamped between the lid 23 and one of the nozzle systems 19a, 19b.

In the exemplary embodiments as they are shown in FIGS. 1 and 2, the compensating diaphragm 15 is in each case clamped between the lid 23 and the nozzle system 19b that directly adjoins the compensating chamber 16.

A common feature of the hydromounts 10 is that they have an improved stiffness due to being adaptable to the respective driving situation. In particular, a large spreading of the stiffness that can be obtained with the hydromounts 10 is ensured. Furthermore, the hydromounts 10 afford good absorption capabilities in the idle range, i.e. in the range of relatively high frequencies.

The invention claimed is:

1. A hydromount for mounting a motor vehicle engine to a vehicle body, the hydromount comprising:
   a supporting spring supporting a mount core and surrounding a working chamber, and
   a compensating chamber separated from the working chamber by a separating assembly and delimited by a compensating diaphragm,
   wherein the separating assembly includes at least two nozzle systems which have one decoupling diaphragm each and in each of which one damping duct is disposed, the compensating chamber and the working chamber are filled with a liquid and are connected to each other in a liquid-conducting manner by the damping ducts, the separating assembly has an absorber duct connecting the working chamber with the compensating chamber, and a switchable actuating member is assigned to the absorber duct.

2. The hydromount according to claim 1, wherein the actuating member can be switched electrically, pneumatically or mechanically.

3. The hydromount according to claim 1, wherein the absorber duct penetrates the separating assembly in an axial direction.

4. The hydromount according to claim 1, wherein the at least two nozzle systems are arranged in series in a direction from the working chamber to the compensating chamber, with the damping ducts of the nozzle systems following one another.

5. The hydromount according to claim 1, wherein the absorber duct has a radial boundary formed on one of the nozzle systems.

6. The hydromount according to claim 1, wherein the separating assembly has at least one intermediate chamber that is disposed in each case between two adjacent nozzle systems.

7. The hydromount according to claim 1, including a housing and a lid, the lid being fixed to the housing by flanging the housing.

8. The hydromount according to claim 7, wherein the compensating diaphragm is clamped between the lid and one of the nozzle systems.

9. The hydromount according to claim 1, wherein the compensating diaphragm comprises a roller bellows.

10. The hydromount according to claim 2, wherein the actuating member is pneumatically switchable, and is configured as an elastic member connected to the compensating diaphragm.

11. The hydromount according to claim 10, wherein the actuating member adjoins an air chamber, such that the actuating member closes the absorber duct with the compensating diaphragm when the air chamber is pressurized, and is sucked towards the air chamber so that the actuating member opens the absorber duct when the air chamber is evacuated to provide a negative pressure in the air chamber.

12. The hydromount according to claim 2, wherein the actuating member is electrically switchable, and the hydromount includes an electrical actuator configured to cause or initiate movement of the actuating member.

13. The hydromount according to claim 12, wherein a feed is formed on or with the absorber duct, and a connecting duct is provided between the feed and the actuating member, the connecting duct connecting the absorber duct with the compensating chamber; and wherein the connecting duct opens when the actuating member moves away from the absorber duct, and the connecting duct closes when the actuating member moves towards the absorber duct.

14. The hydromount according to claim 13, wherein the actuating member and the feed are positively connected.

15. The hydromount according to claim 14, wherein at least one of:
   the actuating member has a projection that extends into a recess formed on the feed; and
   the actuating member has an arm resting against the feed to close off the connecting duct.

16. The hydromount according to claim 1, wherein the supporting spring comprises an elastomeric material.

17. The hydromount according to claim 1, wherein each decoupling diaphragm is accommodated in a positive fit manner in a respective nozzle system of the at least two nozzle systems.

18. A hydromount for mounting a motor vehicle engine to a vehicle body, the hydromount comprising:
   a supporting spring supporting a mount core and surrounding a working chamber, and
   a compensating chamber separated from the working chamber by a separating assembly and delimited by a compensating diaphragm,
   wherein the separating assembly includes at least two nozzle systems which have one decoupling diaphragm each and in each of which one damping duct is disposed, the compensating chamber and the working chamber are filled with a liquid and are connected to each other in a liquid-conducting manner by the damping ducts, the separating assembly has an absorber duct connecting the working chamber with the compensating chamber, and a switchable actuating member is assigned to the absorber duct, wherein the actuating member adjoins an air chamber, such that the actuating member closes the absorber duct with the compensating diaphragm when the air chamber is pressurized, and is sucked in the direction of the air chamber so that the actuating member opens the absorber duct when the air chamber is evacuated so that it is under negative pressure.

19. A hydromount for mounting a motor vehicle engine to a vehicle body, the hydromount comprising:
   a supporting spring supporting a mount core and surrounding a working chamber, and
   a compensating chamber separated from the working chamber by a separating assembly and delimited by a compensating diaphragm,
   wherein the separating assembly includes at least two nozzle systems which have one decoupling diaphragm each and in each of which one damping duct is disposed, the compensating chamber and the working chamber are filled with a liquid and are connected to each other in a liquid-conducting manner by the damping ducts, the separating assembly has an absorber duct connecting the working chamber with the compensating chamber, and a switchable actuating member is assigned to the absorber duct, wherein a feed is formed on the absorber duct, and a connecting duct is formed between the feed and the actuating member, the connecting duct connecting the absorber duct with the compensating chamber, wherein the connecting duct is opened when the actuating member is moved away from the absorber duct, and the connecting duct is closed when the actuating member is moved towards the absorber duct.

20. The hydromount according to claim 19, wherein at least one of:
- the actuating member has a projection that extends into a recess formed on the feed; and
- the actuating member has an arm resting against the feed to close off the connecting duct.

\* \* \* \* \*